(12) United States Patent
Taira et al.

(10) Patent No.: US 11,273,871 B2
(45) Date of Patent: Mar. 15, 2022

(54) SIDE LOWER STRUCTURE OF VEHICLE

(71) Applicant: Toyota Jidosha Kabushiki Kaisha, Toyota (JP)

(72) Inventors: Tomoki Taira, Nagoya (JP); Akira Nishino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/021,380

(22) Filed: Sep. 15, 2020

(65) Prior Publication Data

US 2021/0086838 A1    Mar. 25, 2021

(30) Foreign Application Priority Data

Sep. 19, 2019    (JP) .............................. JP2019-170425

(51) Int. Cl.
*B62D 25/04* (2006.01)
*B62D 25/24* (2006.01)

(52) U.S. Cl.
CPC ............. *B62D 25/04* (2013.01); *B62D 25/24* (2013.01)

(58) Field of Classification Search
CPC ............................... B62D 25/04; B62D 25/24
USPC .................................. 296/193.06, 1.06, 1.07
See application file for complete search history.

(56) References Cited

FOREIGN PATENT DOCUMENTS

| FR | 2849638 A1 * | 7/2004 | ............ B62D 25/24 |
|---|---|---|---|
| JP | 2002-284037 A | 10/2002 | |
| JP | 2005-041260 A | 2/2005 | |

\* cited by examiner

*Primary Examiner* — Dennis H Pedder
(74) *Attorney, Agent, or Firm* — Dinsmore & Shohl LLP

(57) ABSTRACT

A vehicle side structure includes a pillar which extends vertically at a side of a vehicle, a service hole which is provided at a lower portion of the pillar, a cover that closes the service hole, and a seal which is provided around the full periphery of the cover to seal between a perimeter of the cover and a perimeter of the service hole.

2 Claims, 2 Drawing Sheets

SIDE LOWER STRUCTURE OF VEHICLE

CROSS REFERENCE TO RELATED APPLICATION

This application claims priority to Japanese Patent Application No. 2019-170425 filed on Sep. 19, 2019, which is incorporated herein by reference in its entirety including the specification, claims, drawings, and abstract.

TECHNICAL FIELD

The present disclosure relates to a side lower structure of a vehicle, in particular, a lower portion of a pillar.

BACKGROUND

Pillars are provided as vertical members which function as window frames and retain vehicle body rigidity. The pillars are respectively referred to using letters assigned from the front of the vehicle towards the rear, for example, A pillar, B pillar, C pillar, and so forth. Generally, the upper ends of the pillars are connected to the roof, whereas the lower ends of the pillars are connected to a rocker that extends along the longitudinal axis of the vehicle.

Service holes are provided on the vehicle body at various locations for assembly and maintenance. JP 2005-041260 A describes a service hole provided at a lower end of a pillar.

Water may enter from outside depending on the positions of the service holes. In particular, when the service holes are provided at a lower portion of the vehicle, it is necessary to provide some measures to prevent ingress of water into the passenger compartment through the service holes.

SUMMARY

The present disclosure provides a side lower structure of a vehicle including a pillar which extends vertically at a side of the vehicle, a service hole which is provided at a lower portion of the pillar, a cover which closes the service hole, and a seal which is provided around the full periphery of the cover to seal between a perimeter of the cover and a perimeter of the service hole.

The present disclosure may also include an interior member which is disposed on a passenger compartment side of the service hole. The interior member may include a protruding portion which protrudes between a lower edge of the cover and a lower edge of the service hole, and the seal may be in contact with an upper surface of the protruding portion of the interior member.

The interior member may be a wire harness holder.

According to the present disclosure, ingress of water can be reliably prevented by providing a seal around the full periphery of the cover.

BRIEF DESCRIPTION OF DRAWINGS

Embodiments of the present disclosure will be described based on the following figures, wherein.

DETAILED DESCRIPTION

A side lower structure of a vehicle according to an embodiment of the present disclosure is described below with reference to the attached drawings. The present disclosure should not be limited to the embodiments described below.

Figure 1:
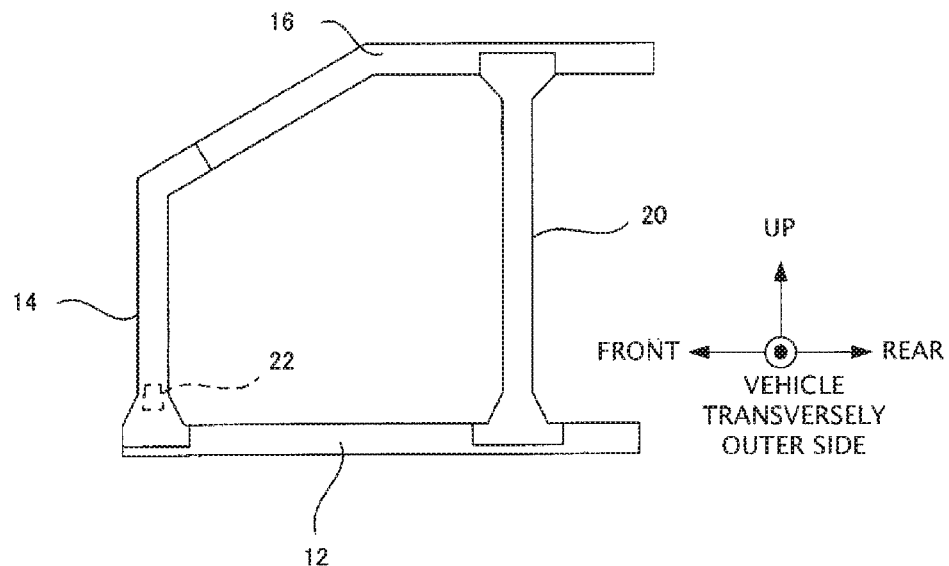
FIG. 1 is a diagram schematically showing a side frame structure (a left side portion) of a vehicle body.

FIG. 1 is a diagram schematically showing a side frame structure (a left side portion) of a vehicle body. A rocker 12 is disposed at a bottom of the side structure. The rocker 12 is a hollow square columnar member which extends along the longitudinal axis of the vehicle. An A pillar 14 is disposed at the front of the rocker 12. The lower end of the A pillar 14 is connected to the rocker 12 from which the A pillar 14 extends upward. The upper end of the A pillar 14 is connected to the front end of a roof side rail 16, which extends along the longitudinal axis of the vehicle. The upper end of the vertically extending B pillar 20 is connected around a center portion of the roof side rail 16, whereas the lower end of the B pillar 20 is connected to the rocker 12. In the present embodiment, the rocker 12, the A pillar 14, the roof side rail 16, and the B pillar 20 are made of steel.

A door is attached in a space surrounded by the rocker 12, the A pillar 14, the roof side rail 16, and the B pillar 20. In general, the door is pivotably attached to the A pillar 14 at the front of the door such that the door is pivotable about an axis at the front.

The A pillar 14 is a vertically extending hollow rectangular column formed with an A pillar inner panel 14a and an A pillar outer panel 14b coupled together at front and rear edges. A service hole 22 which is opened towards the passenger compartment is provided at a lower portion of the A pillar inner panel 14a of the A pillar 14.

In a side lower structure of a vehicle according to the present disclosure, a cover which closes the service hole 22 is provided and a seal is provided around the cover to seal between the perimeter of the cover and the perimeter of the service hole 22. This structure maintains watertight sealing of the service hole 22 formed in the A pillar 14 such that ingress of water into the passenger compartment from outside can be reliably prevented.

While in most instances the seal maintains a watertight seal between the service hole 22 and the cover, in a side lower structure of a vehicle according to the present disclosure, another interior member, such as a connector holder of a wire harness, may be inserted between the seal and the service hole 22. In such an instance, the connector holder of the wire harness can itself provide a watertight seal between the service hole 22 and the seal.

The embodiment described below describes a structure in which the connector holder of the wire harness is inserted into the service hole 22.

Figure 2:
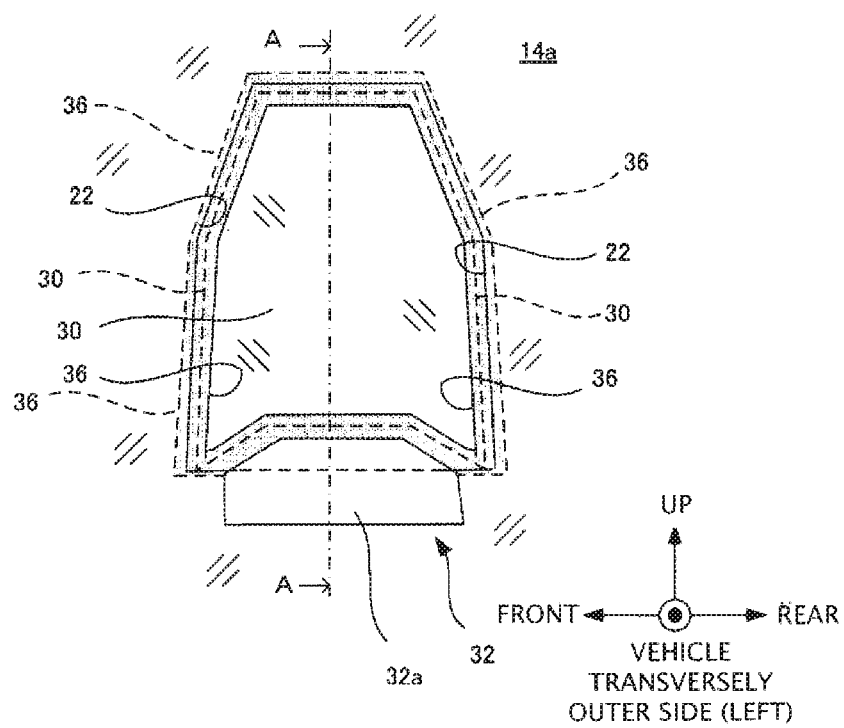
FIG. 2 is a diagram showing a cover attached to a service hole.
Figure 3:
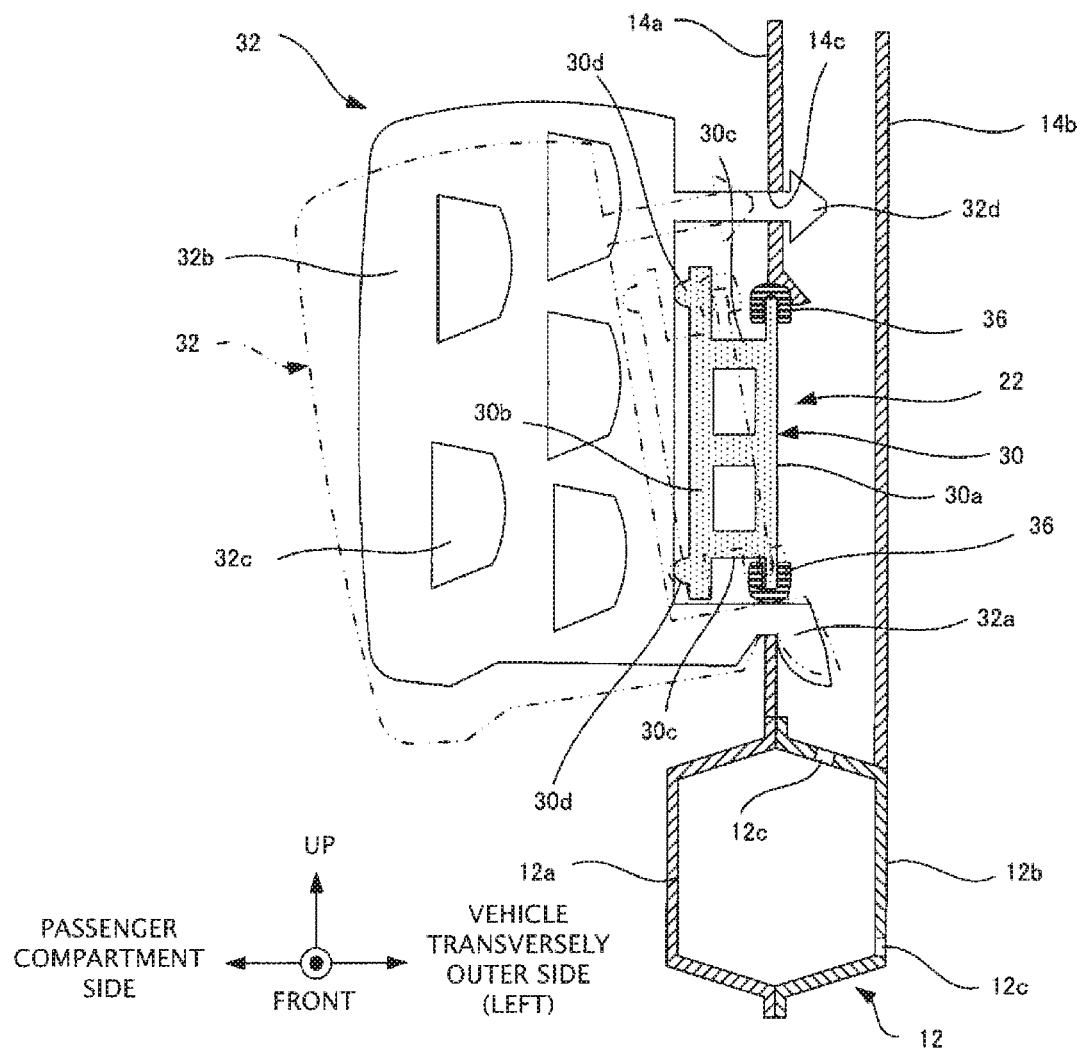
FIG. 3 is a cross-sectional view taken along line A-A in FIG. 2.

FIG. 2 shows the service hole 22 to which a cover 30 is attached. In FIG. 2, with the A pillar outer panel 14b removed, an A pillar inner panel 14a, which is a vehicle interior member of the A pillar 14, is viewed from a transversely outer side of the vehicle. The service hole 22 has an overall general rectangular shape, with an upper portion narrower than a lower portion. FIG. 3 is a cross section taken along line A-A in FIG. 2, in other words, a cross section which is a vertical plane at the center in the longitudinal direction of the service hole 22. A part of another member, a connector holder 32, is disposed over a lower edge of the service hole 22. The connector holder 32 holds a wire harness which includes wires connected to electric components inside the door. As shown in FIG. 3, the connector holder 32 is disposed behind the service hole 22, in other words, on the vehicle compartment side of the A pillar 14. The connector holder 32 may be made of plastic.

The connector holder 32 includes a protrusion 32a which protrudes towards the outer side (into the A pillar 14). In a vehicle side view shown in FIG. 2, the connector holder 32 has a horizontally elongated rectangular shape with a raised center portion.

When the protrusion 32a of the connector holder 32 is set at the lower edge of the service hole 22, the bottom contour of the space formed is raised upward accordingly. A cover 30 having a shape corresponding to this formed space is disposed. Specifically, the cover 30 has an overall trapezoidal shape which slightly tapers towards the top, but with the lower edge (bottom) recessed upward. A seal 36 is disposed around the entire periphery of the cover 30. The seal 36 is provided at the circumferential edge of the A pillar inner panel 14a around the service opening 22 and an upper surface of the protrusion 32a of the connector holder 32. In this way, the cover 30 closes the service hole 22. The cover 30 may be made of plastic or metal. The seal 36 may be made of elastic rubber, for example, EPT-Sealer (trademark of Nitto Denko Corporation).

In FIG. 3, the rocker 12 is formed with a rocker inner panel 12a and a rocker outer panel 12b coupled together. The rocker inner panel 12a protrudes inward, whereas the rocker outer panel 12b protrudes outward such that a cross section of inner space formed between them has a generally rectangular shape. Drainage openings 12c are provided in an upper surface and at a side lower portion of the rocker outer panel 12b to exhaust water which has entered into the A pillar 14 and the rocker 12.

The lower end of the A pillar outer panel 14b is attached to an upper portion of the rocker outer panel 12b, whereas the lower end of the A pillar inner panel 14a is attached to an upper portion of the rocker inner panel 12a. The panels may be attached by welding. Although the A pillar 14 and the rocker 12 are attached at opposing ends in FIG. 3, the panels may be welded with their ends overlapping each other by a predetermined amount.

The protrusion 32a of the connector holder 32 is positioned over a bottom portion of a circumferential edge of the A pillar inner panel 14a around the service hole 22. The protrusion 32a includes an upwardly recessed groove with which the bottom edge of the service hole 22 is in contact. The bottom portion of a circumferential edge of the A pillar inner panel 14a around the service hole 22 is received in this groove.

The connector holder 32 includes a cuboid body portion 32b to retain a wire harness inside the passenger compartment. The protrusion 32a protrudes from a lower portion of the body portion 32b, which includes multiple holes 32c running through the body portion 32b along the longitudinal axis of the vehicle. The wire harness is held through the holes 32c.

A pin (or pins) 32d is disposed outwards at an upper portion of the connector holder 32. A tip portion of the pin 32d is inserted into a support hole (or support holes) 14c formed in the A pillar inner panel 14a which is provided at a position (or positions) corresponding to the pin (or pins) 32d. The tip portion of the pin 32d is widened to have a conical portion such that the bottom of the conical portion is supported around the support hole 14c.

The cover 30 is positioned on the outer side (A pillar 14 side) of the connector holder 32. The cover 30 includes a first wall portion 30a on the A pillar 14 side, a second wall portion 30b on the passenger compartment side, and an intermediate portion 30c between the two to connect them. When viewed from a transversely outer side of the vehicle, the first wall portion 30a has a shape in which the top and sides conform to the shape of the service hole 22, and the bottom conforms to the top surface of the protrusion 32a of the connector holder 32 disposed at the bottom portion of the service hole 22. The intermediate portion 30c is shorter than the first wall portion 30a, whereas the second wall portion 30b is slightly longer than the first wall portion 30a. When viewed from a transversely outer side of the vehicle, the shapes of these portions are almost equal (similar) to each other. When viewed from the front or rear of the vehicle, the cover 30 has a shape in which two thin boards are connected with a single thick board which has two through holes along the longitudinal axis of the vehicle. The seal 36 is disposed around the entire perimeter of the first wall portion 30a.

A top portion of the circumferential edge of the A pillar inner panel 14a around the service hole 22 is bent outwards such that a top portion of the seal 36 is positioned under a lower internal side of the bent edge portion. Of the circumferential edge of the A pillar inner panel 14a around the service hole 22, not only the top portion defining the top edge of the service hole 22 but also both sides of the circumferential edge may be bent outwards such that the side portions of the seal 36 which covers the side edges of the cover 30 are disposed inner side of the bent portions.

A bottom portion of the seal 36 which seals the bottom edge of the cover 30 is supported on the upper surface of the protrusion 32a of the connector holder 32. A positioning protrusion may be provided on the upper surface of the protrusion 32a of the connector holder 32 to prevent the seal 36 sealing the bottom edge of the cover 30 from moving toward the A pillar outer panel 14b.

Multiple protrusions 30d are provided on a surface of the second wall portion 30b of the cover 30 which faces the passenger compartment. The protrusions 30d are in contact with a surface of the connector holder 32 which faces the A pillar 14.

Procedures to attach the cover 30 to the service hole 22 are described below. As shown by the broken lines in FIG. 3, the groove of the protrusion 32a at the bottom of the connector holder 32 is positioned over the bottom portion of the circumferential edge of the A pillar inner panel 14a around the service hole 22. The connector holder 32 is tilted such that the upper end is tilted toward the passenger compartment side. The cover 30 is attached on the surface of the connector holder 32 which faces toward the A pillar 14. From such an orientation, the top end of the connector holder 32 is pressed against the A pillar 14 using the groove of the protrusion 32a as a fulcrum. This inserts the pin (or pins) 32d into the support hole (or support holes) 14c such that the connector holder 32 is fixed on a surface of the A pillar inner panel 14a of the A pillar 14 which faces the passenger compartment. The seal 36 at the upper end of the cover 30 is pressed against the bent portion of the A pillar inner panel 14a such that a downward force is applied to the cover 30. In this way, the cover 30 is pressed against the upper surface of the protrusion 32a of the connector holder 32.

As described above, because the seal 36 seals the entire perimeter of the cover 30, and the protrusion 32a of the connector holder 32 seals between the cover 30 and the portion of the A pillar inner panel 14a which defines a circumference edge of the service hole 22, ingress of water into the passenger compartment from the service hole 22 can be prevented. For example, when a vehicle travels on a flooded road where the water level is high, the water may reach the service hole 22 beyond the rocker 12. A structure according to an embodiment of the present disclosure can prevent ingress of water into the passenger compartment even in such a case.

The invention claimed is:
1. A side lower structure of a vehicle, comprising:
   a pillar extending vertically at a side of the vehicle;
   a service hole provided at a lower portion of the pillar;
   a cover closing the service hole;
   a seal provided around a full periphery of the cover to seal between a perimeter of the cover and a perimeter of the service hole; and
   an interior member disposed on a passenger compartment side of the service hole, the interior member comprises a protruding portion which protrudes between a lower edge of the cover and a lower edge of the service hole, and the seal is in contact with an upper surface of the protruding portion of the interior member.
2. The side lower structure of a vehicle according to claim 1, wherein the interior member is a wire harness holder.

* * * * *